United States Patent [19]

Dietmar

[11] 4,274,667
[45] Jun. 23, 1981

[54] BUMPER FOR MOTOR VEHICLES

[75] Inventor: Peter Dietmar, Stuttgart-Feuerbach, Fed. Rep. of Germany

[73] Assignee: Dr. Ing. h.c.F. Porsche Aktiengesellschaft, Stuttgart, Fed. Rep. of Germany

[21] Appl. No.: 48,028

[22] Filed: Jun. 13, 1979

[30] Foreign Application Priority Data

Jun. 13, 1978 [DE] Fed. Rep. of Germany ....... 2825838

[51] Int. Cl.³ .............................................. B60R 19/00
[52] U.S. Cl. ................................... 293/102; 293/155; 280/770; 296/188
[58] Field of Search ................. 293/41, 102, 132, 141, 293/142, 154, 155; 296/188, 189; 280/770

[56] References Cited

U.S. PATENT DOCUMENTS 3,847,428  11/1974  Uebelstädt ........................... 293/132
4,193,621  3/1980  Peichl ................................. 293/142

Primary Examiner—Randolph A. Reese
Assistant Examiner—John A. Carroll
Attorney, Agent, or Firm—Craig and Antonelli

[57] ABSTRACT

A bumper for motor vehicles has a rigid support and a covering made of elastic material. The elastic material is provided with at least two arms extending from an edge of the covering that is adjacent the body in use. A first of these arms is located within the outside contour of the covering and includes a fastening section for attaching the material to the motor vehicle body, and a second of the arms forms an extension of the outside contour of the covering and conceals the first of the arms. A flexible hinge-like construction is utilized to connect the covering to the body, according to preferred embodiments, and so as to protect the body of the vehicle from deformation due to impact loading of the bumper.

12 Claims, 4 Drawing Figures

BUMPER FOR MOTOR VEHICLES

BACKGROUND AND SUMMARY OF THE INVENTION

The invention relates to a bumper for motor vehicles, said bumper consisting of a rigid support and a covering made of elastic material, said covering being fastened over a fastening section and attached to the body by means of a boltable fastening element.

In a known bumper of the species described hereinabove (publication in "Automobiltechnische Zeitschrift", Volume 76, No. 11, Page 375, 1974), the covering is accomplished with flange-like sections on bent portions of the body. This design has the disadvantage that upon sufficient impact upon the bumper, forces are transmitted into the body via the covering sections sufficient to produce permanent deformation.

The goal of the invention is to attach the bumper covering to the body in such a manner that it provides a reliable fastening while accepting the forces to be absorbed without deformation of the body.

According to preferred embodiments of the invention, this goal is achieved by virtue of the fact that the covering is provided with at least two arms in the area adjacent the vehicle body, the first arm being located within the outside contour of the covering and body, and forming a fastening section, and the second arm being connected to the covering so as to form, with the covering, a continuation of the outer body contour that covers the first arm. It is advantageous in this connection for the arms to be disposed in a fork-like manner on the covering. When force is applied to the covering, the first arm and/or a member connected between it and the body flexes like a hinge.

In addition, in certain embodiments, the first arm is connected to a U-shaped member, that in use is open toward an end of the vehicle, a cross-bar of said U-shaped member being made elastic and forming the hinge. The hinge effect is reinforced by recesses in the cross-bar. The fastening section of the first arm can also be bent at right angles, whereby the area of the arm which abuts this section forms the hinge. In such an embodiment, a bolt element of the fastening section is accessible from the outside of the body. The second arm is in the form of lips. Finally, the second arm is mounted on the body to form a joint.

The special advantages achieved by virtue of the invention include the fact that when force is applied to the bumper, the covering at the first arm bends, so that the body is not deformed at this point. The design of the first arm, especially its fastening and its hinge, is effectively protected by the second arm. Moreover, the installation of the covering is simple if the bolt element is accessible from the outside of the body.

These and further objects, features and advantages of the present invention will become more obvious from the following description when taken in connection with the accompanying drawings, wherein

DETAILED DESCRIPTION OF THE DRAWINGS

Figure 1:
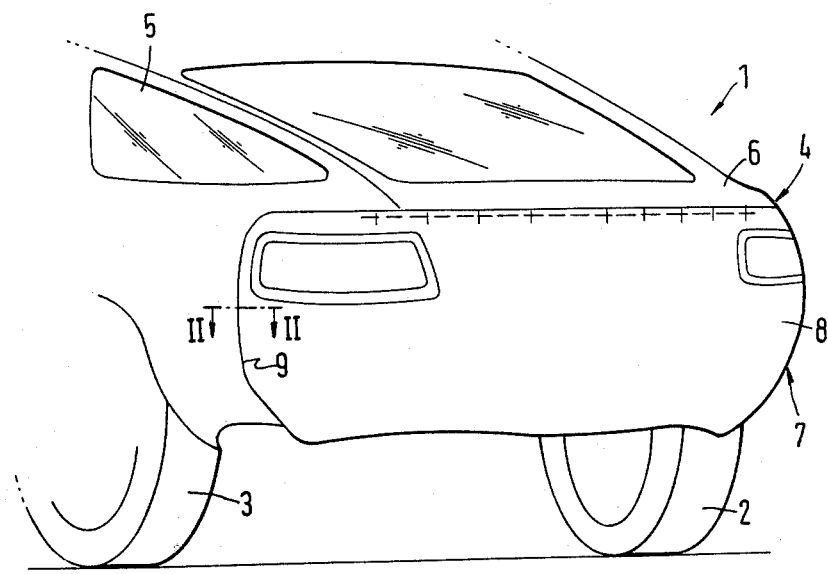
FIG. 1 is a three-quarters view of the rear of a motor vehicle, with the bumper according to the preferred embodiment of the invention.

In the area shown, vehicle 1 comprises wheels 2 and 3 and a body 4 with windows 5 and a hatchback 6. Body 4 is provided with a bumper 7, formed by a covering 8 and a rigid support disposed behind this cover and not shown in greater detail. This support supports the covering and is in turn supported on hydraulic shock absorbers, which are likewise not shown since such bumper supporting arrangements are conventional.

Covering 8 is made of elastic material, for example, polyurethane, and yields on impact, occurring, for example, at twice walking speed, then resumes its original shape, As can be seen from FIG. 1, the bumper covering is a shell that wraps from a side quarter panel on one side of the body, across the end of the vehicle (whereat the noted conventional supports are located), to the opposite side quarter panel. Therefore, since both lateral portions of the bumper arrangement are the same and the central bumper portion can be constructed according to conventional practice, all further descriptions will be with reference to one corner of the bumper, it being understood that they apply not just to one rear corner, but are applicable to both corners as well as to bumper-vehicle body junctions located elsewhere, such as at front bumpers.

Figure 2:
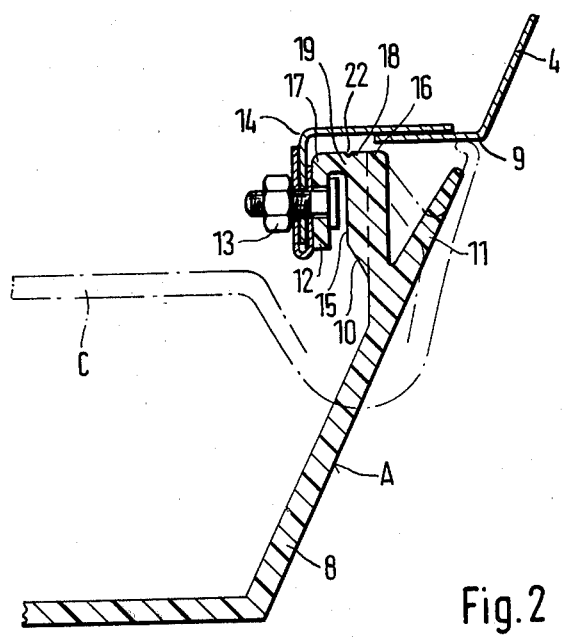
FIG. 2 is a mirror-image cross section along line II—II in FIG. 1 on an enlarged scale.

In the area 9 which abuts body 4, covering 8 comprises two arms 10 and 11 (FIG. 2). The first arm 10 is located within the outside contour A of the covering which conforms to that of body 4. Fastening section 12 is fastened to a flange 14 of body 4, which runs the length of the vehicle, with a bolt element 13 interposed therebetween The second arm 11 covers the first arm 10 and forms a continuation of outside contour A. In the preferred embodiments, a space is provided between body 4 and arm 11. However, if engineering or styling require it, arm 11 can also extend to or be mounted directly on body 4.

Both arms 10 and 11 are disposed in a fork-like manner extending from covering 8. When a force is exerted on covering 8, first arm 10 deflects like a hinge. For this purpose, arm 10 is connected to a U-shaped section 15 open toward the end of the vehicle, the cross-arm 18 connecting the legs 16 and 17 of said U-shaped section being elastic and forming a hinge 19. Section 15 can be connected integrally with covering 8 in a unitary construction (FIG. 2).

Figure 3:
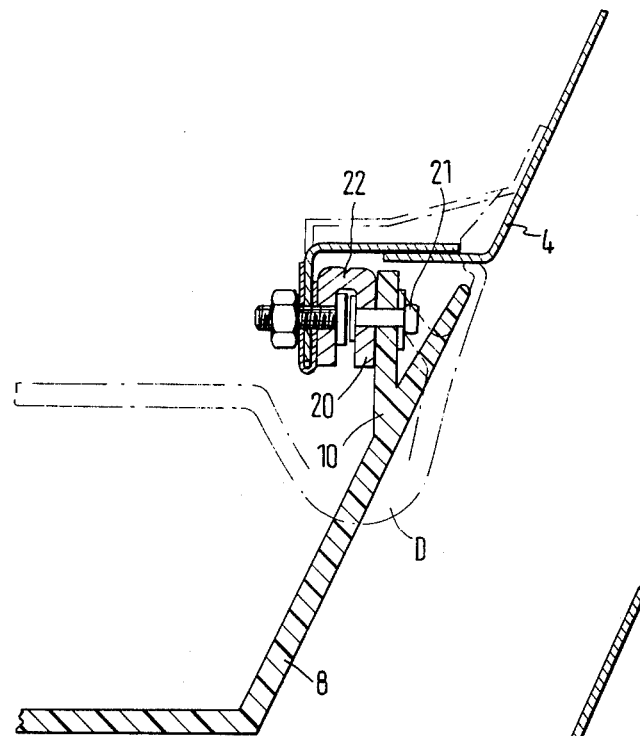
FIG. 3 is a view similar to FIG. 2 of a second embodiment.

However, a separate part 20 can also be provided, said part being connected with first arm 10 by a fastening element 21 (rivet) (FIG. 3). The broken line in FIG. 2 is merely for the purpose of showing the U-shaped nature of section 15 and for comparison with FIG. 3, wherein its counterpart 20 is a separate element.

The action of hinges 19 or 20 is reinforced by a recess 22 on cross-arm 18.

Figure 4:
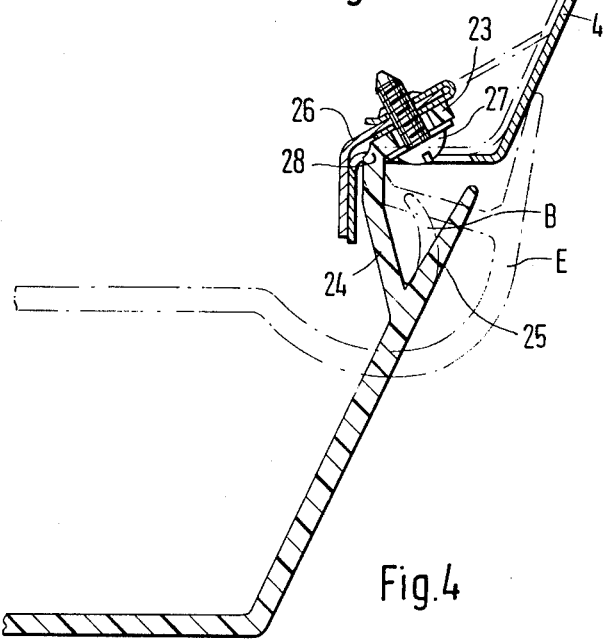
FIG. 4 is a view similar to Figure of another embodiment.

According to the further embodiment of FIG. 4, fastening section 23 is bent at right angles to a portion of first arm 24 that is covered by second arm 25, and is fitted against a wall 26 of body 4. Wall 26 runs diagonally to the central plane along the length of the vehicle. Hinge 28 is located in an area of arm 24 which abuts fastening section 23. A bolt 27 holds mounting section 23 against wall 26, said bolt being accessible with tools from the outside of body 4, while the lip-shaped second arm 25 is brought manually into position B.

Positions C, D, and E shown in dot-dash lines in FIGS. 2, 3, and 4, respectively, show how the covering 4 deflects under load, such as by impact against an end of the vehicle.

It is understood that the present invention is not limited to the details shown and described herein but is susceptible to numerous changes and modifications as known to those skilled in the art such that the present invention is intended to cover all such changes and modifications as are encompassed by the scope of the appended claims.

I claim:

1. A bumper for motor vehicles having a rigid support and a covering made of elastic material, said material being attachable to the body of a motor vehicle by means of a fastening section and by means of boltable fastening elements, characterized by the fact that the covering has at least two arms extending from an edge of the covering that is adjacent the body in use, whereby a first of said arms is located within the outside contour of the covering and includes the fastening section and a section of said arms forms an extension of the outside contour of the covering and further characterized by the fact that the first arm is connected with a U-shaped section having a cross-arm connecting a pair of legs, said cross-arm being elastic and forming a flexible hinge-like member.

2. A bumper according to claim 1, characterized by the fact that arms are disposed in a fork-like manner extending from the covering.

3. A bumper according to claim 1, characterized by the fact that the flexible hinge-like member is provided with a recess for reinforcing hinge-like deflection thereof.

4. A bumper according to claim 1, characterized by the fact that the second arm is lip-shaped.

5. A bumper according to claim 1, characterized by the fact that the second arm is disposed to form a joint with respect to the body.

6. A bumper for motor vehicles having a rigid support and a covering made of elastic material, said material being attachable to the body of a motor vehicle by means of a fastening section and by means of boltable fastening elements, characterized by the fact that the covering has at least two arms extending from an edge of the covering that is adjacent the body in use, whereby a first of said arms is located within the outside contour of the covering and includes the fastening section and a second of said arms forms an extension of the outside contour of the covering, further characterized by the fact that the firm arm is connected with a U-shaped section having a cross-arm connecting a pair of legs, said cross-arm being elastic and forming a flexible hinge-like member, and that the fastening section of the first arm is bent so as to be at right angles to a portion of the first arm extending from the covering, and an area of the first arm which abuts the fastening section is formed as a flexible hinge-like member.

7. A bumper according to claim 6, characterized by the fact that said fastening section is angled toward said second arm so that a bolt element of the fastening section is accessible from the outside of covering.

8. In a motor vehicle body construction of the type having vehicle body panel means, a bumper, and a covering of elastic material on said bumper, the improvement comprising flexible means for protecting said body panel means from deformation due to impact loading of the bumper, said flexible means being formed at connections between edges of the covering and said body panel means, wherein said flexible means is a flexible arm extending from said covering and fastened to the body panel means, said arm being constructed to flex in a hinge-like manner when a force is applied against the cover, wherein said flexible means includes a flexible U-shaped member connected to the flexible arm and body panel means, and wherein a cross-member of the U-shaped member is recessed to improve hinge-like bending on impact.

9. A motor vehicle body construction according to claim 8, wherein said flexible arm is an inner one of at least two arms extending from said covering, an outer one of said arms covering said inner arm and forming a part of an external vehicle body contour defined by said panel means and covering.

10. A motor vehicle body construction according to claim 9, wherein said arms are a pair of arms extending from said covering in a fork-like manner.

11. In a motor vehicle body construction of the type having vehicle body panel means, a bumper, and a covering of elastic material on said bumper, the improvement comprising flexible means for protecting said body panel means from deformation due to impact loading of the bumper, said flexible means being formed at connections between edges of the covering and said body panel means, wherein said flexible means is a flexible arm extending from said covering and fastened to the body panel means, said arm being constructed to flex in a hinge-like manner when a force is applied against the cover, wherin said flexible arm is an inner one of at least two arms extending from said covering, an outer one of said arms covering said inner arm and forming a part of an external vehicle body contour defined by said panel means and covering, and wherein an end portion of said inner arm is bent away from a vehicle body longitudinal center line and is fastened to said body panel means by externally accessible fastener means.

12. A motor vehicle body construction according to claims 11, wherein the flexible means are located between ends of said covering and corners of said body means.

* * * * *